(12) United States Patent
Chen

(10) Patent No.: US 12,513,580 B2
(45) Date of Patent: Dec. 30, 2025

(54) NETWORK SWITCHING METHOD

(71) Applicant: VIVO MOBILE COMMUNICATION CO.,LTD., Guangdong (CN)

(72) Inventor: Li Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 468 days.

(21) Appl. No.: 17/577,865

(22) Filed: Jan. 18, 2022

(65) Prior Publication Data

US 2022/0141734 A1 May 5, 2022

Related U.S. Application Data

(63) Continuation of application No. PCT/CN2020/106157, filed on Jul. 31, 2020.

(30) Foreign Application Priority Data

Jul. 31, 2019 (CN) .......................... 201910703666.6

(51) Int. Cl.
*H04W 36/00* (2009.01)
*H04W 76/30* (2018.01)

(52) U.S. Cl.
CPC ... *H04W 36/0077* (2013.01); *H04W 36/0058* (2018.08); *H04W 36/033* (2023.05); *H04W 76/30* (2018.02)

(58) Field of Classification Search
CPC ........... H04W 36/03; H04W 36/00837; H04W 76/30; H04W 36/0077; H04W 36/0058
See application file for complete search history.

(56) References Cited

U.S. PATENT DOCUMENTS

| | | |
|---|---|---|
| 2013/0188604 A1 | 7/2013 | Chin et al. |
| 2016/0373984 A1 | 12/2016 | Hara |
| 2018/0035344 A1 | 2/2018 | Wang |
| 2018/0124674 A1 | 5/2018 | Vutukuri et al. |
| 2018/0199390 A1* | 7/2018 | Hahn .................. H04B 7/2606 |
| 2019/0281509 A1 | 9/2019 | Tidestav et al. |
| 2020/0252755 A1* | 8/2020 | Novlan .................. H04W 4/06 |

FOREIGN PATENT DOCUMENTS

| | | |
|---|---|---|
| CN | 101031146 A | 9/2007 |
| CN | 101048001 A | 10/2007 |
| CN | 103686911 A | 3/2014 |
| CN | 105992292 A | 10/2016 |
| CN | 107690165 A | 2/2018 |

(Continued)

OTHER PUBLICATIONS

The First Office Action of Priority Application No. CN 201910703666.6 issued by the Chinese Patent Office on Mar. 2, 2021.

(Continued)

*Primary Examiner* — Anez C Ebrahim
(74) *Attorney, Agent, or Firm* — IP & T GROUP LLP

(57) ABSTRACT

A network switching method includes: in a case that a first terminal establishes a network connection to the network device through a second terminal, establishing a first network connection to the first terminal, and instructing the second terminal to release a second network connection to the first terminal.

20 Claims, 3 Drawing Sheets

(56) References Cited

FOREIGN PATENT DOCUMENTS

| CN | 107889080 A | 4/2018 |
|----|-------------|--------|
| CN | 108024295 A | 5/2018 |
| CN | 109792643 A | 5/2019 |
| EP | 2763495 A1 | 8/2014 |
| EP | 3481106 A1 | 5/2019 |
| WO | 2018/063081 A1 | 4/2018 |
| WO | 2018/165150 A1 | 9/2018 |

OTHER PUBLICATIONS

The Second Office Action of Priority Application No. CN 201910703666.6 issued by the Chinese Patent Office on Aug. 17, 2021.
International Search Report and Written Opinion of Priority Application No. PCT/CN2020/106157 issued by the Chinese Patent Office on Oct. 19, 2020.
Extended European Search Report for the European Patent Application No. 20847780.2 issued by the European Patent Office on Aug. 12, 2022.
Ericsson, Overview of ProSe UE to Network Relay & Service Continuity, 3GPP TSG-RAN WG1 #80bis, R1-151765, Apr. 20 to 24, 2015, Belgrade, Serbia.

* cited by examiner

NETWORK SWITCHING METHOD

CROSS-REFERENCE OF RELATED APPLICATIONS

This application is a Bypass Continuation application of PCT/CN2020/106157 filed on Jul. 31, 2020, which claims priority to Chinese Patent Application No. 201910703666.6 filed on Jul. 31, 2019, which are incorporated herein by reference in their entirety.

TECHNICAL FIELD

The present disclosure relates to the field of communications technologies, and in particular, to a network switching method, a network device, and a terminal.

BACKGROUND ART

Currently, networking methods of a wearable device include: the wearable device is connected to a terminal of a cellular network connection type through a non-cellular network, and the terminal of the cellular network connection type communicates with a network device through a cellular network, so that the wearable device indirectly communicates with the network device through the terminal of the cellular network connection type; or the wearable device directly communicates with the network device through a cellular network and communicates through the network device.

SUMMARY

The present disclosure provides a network switching method, a network device, and a terminal.

According to a first aspect, some embodiments of this disclosure provide a network switching method, applied to a network device. The method includes:

in a case that a first terminal establishes a network connection to the network device through a second terminal, establishing a first network connection to the first terminal, and instructing the second terminal to release a second network connection to the first terminal.

According to a second aspect, some embodiments of the present disclosure further provide a network switching method, applied to a first terminal. The method includes:

in a case that the first terminal establishes a network connection to a network device through a second terminal, establishing a first network connection to the network device, and releasing a second network connection to the second terminal.

According to a third aspect, some embodiments of the present disclosure provide a network switching method, applied to a second terminal. The method includes:

in a case that a first terminal establishes a network connection to the network device through a second terminal, releasing a second network connection to the first terminal;

where the second terminal is connected to the network device through the first network connection, and the second terminal is connected to the first terminal through the second network connection.

According to a fourth aspect, some embodiments of the present disclosure further provide a network device, including:

a first processing module, configured to: in a case that a first terminal establishes a network connection to the network device through a second terminal, establish a first network connection to the first terminal, and instruct the second terminal to release a second network connection to the first terminal.

According to a fifth aspect, some embodiments of the present disclosure further provide a network device, including: a memory, a processor, and a computer program stored on the memory and executable on the processor. The computer program, when executed by the processor, implements steps of the foregoing network switching method.

According to a sixth aspect, some embodiments of the present disclosure further provide a terminal, where the terminal is a first terminal, and includes:

a second processing module, configured to: in a case that the first terminal establishes a network connection to a network device through a second terminal, establish a first network connection to the network device, and release a second network connection to the second terminal.

According to a seventh aspect, some embodiments of the present disclosure further provide a terminal, where the terminal is a first terminal, and includes: a memory, a processor, and a computer program stored in the memory and executable on the processor. The computer program, when executed by the processor, implements steps of the foregoing network switching method.

According to an eighth aspect, some embodiments of the present disclosure further provide a terminal, where the terminal is a second terminal, and includes:

a third processing module, configured to: in a case that a first terminal establishes a network connection to the network device through a second terminal, release a second network connection to the first terminal;

where the second terminal is connected to the network device through the first network connection, and the second terminal is connected to the first terminal through the second network connection.

According to a ninth aspect, some embodiments of the present disclosure further provide a terminal, where the terminal is a second terminal, and includes: a memory, a processor, and a computer program stored in the memory and executable on the processor. The computer program, when executed by the processor, implements steps of the foregoing network switching method.

According to a tenth aspect, some embodiments of the present disclosure further provide a non-transitory computer-readable storage medium. The non-transitory computer-readable storage medium stores a computer program. The computer program, when executed by a processor, implements steps of the foregoing network switching method.

BRIEF DESCRIPTION OF DRAWINGS

To describe the technical solutions in embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive another drawing from these accompanying drawings.

DETAILED DESCRIPTION OF THE EMBODIMENTS

To make the objectives, technical solutions, and advantages of the present disclosure clearer, the following further describes the present disclosure in detail with reference to the accompanying drawings and specific embodiments.

General, when a wearable device is in a connected state, in a scenario of switching from a cellular network connection to a network device to a non-cellular network connection, the terminal first cuts off the original cellular network connection, and then connects to another terminal device through a non-cellular network, and the another terminal device is connected to the cellular network, so that the terminal indirectly implements communication. Switching of the network connection may cause service interruption.

To resolve the problem in the related technology that network connection switching of a terminal causes service interruption, the present disclosure provides a network switching method, a network device, and a terminal.

Figure 1:
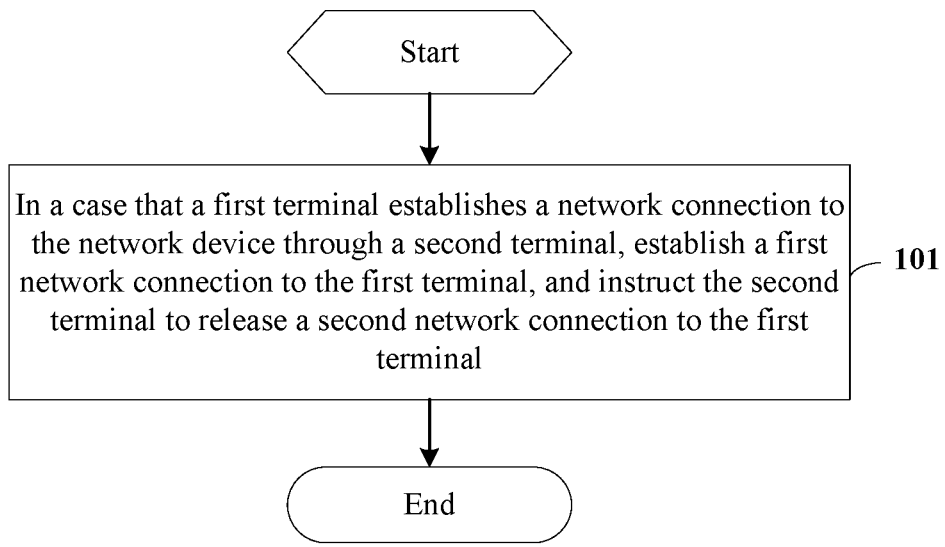
FIG. 1 is a schematic flowchart 1 of a network switching method according to some embodiments of the present disclosure.

As shown in FIG. 1, some embodiments of the present disclosure provide a network switching method applied to a network device. The method includes:

Step 101: In a case that a first terminal establishes a network connection to the network device through a second terminal, establish a first network connection to the first terminal, and instruct the second terminal to release a second network connection to the first terminal.

It should be noted that, in the embodiments of the present disclosure, the network device may be a same base station, or may include two different base stations, that is, a first base station and a second base station. The first base station and the second base station can communicate with each other. When the network device is a same base station, the base station may establish the first network connection to each of the first terminal and the second terminal, and the base station may implement information exchange with the first terminal or the second terminal such as send a request, receive a response, or receive an indication.

When the network device includes a first base station and a second base station, the first terminal is connected to the first base station through a first network, the first base station and the first terminal implement information exchange such as send a request, receive a response, or receive an indication, the second terminal is connected to the second base station through the first network, and the second base station and the second terminal implement information exchange such as send a request, receive a response, or receive an indication.

It should be noted that, in a case that the first terminal establishes the second network connection to the second terminal and the second terminal establishes the first network connection to the network device, the network device establishes the first network connection to the first terminal, and instructs the second terminal to release the second network connection to the first terminal. This can ensure service continuity when the terminal switches from a non-cellular network connection to a cellular connection to the network device.

In some embodiments of the present disclosure, the non-cellular network connection between the first terminal and the second terminal is switched to a direct cellular network connection to the network device, to implement some or all of services of the first terminal and the second terminal.

Herein, it should be noted that, the first network connection refers to that the first terminal or the second terminal is connected to or camps on or non-activated with a cellular network for the network device; and the second network connection is a non-cellular network connection between the first terminal and the second terminal.

It should be noted that, the first terminal or the second terminal is connected to or camps on or non-activated with a cellular network for the network device means that: the first terminal is connected to or camps on a cellular network in RRC_Connected mode, RRC_Idle mode, or RRC_Inactive mode, or the second terminal is connected to or camps on a cellular network in RRC_Connected mode, RRC_Idle mode, or RRC_Inactive mode.

In some embodiments of the present disclosure, the first terminal or the second terminal is connected to a network through a cellular network. The cellular network includes a second generation mobile communication network (2G), a third generation mobile communication network (3G), a fourth generation mobile communication network (4G), a fifth generation mobile communication network (5G), and a future evolved cellular communication system.

The first terminal may be a wearable device (such as a watch, earphones, glasses, a hand ring, etc.), and the second terminal may be other terminal devices (such as a mobile phone, a person computer, a notebook, a handheld computer, etc.); or the second terminal may be a wearable device (such as a watch, earphones, glasses, a hand ring, etc.), and the first terminal may be other terminal devices (such as a mobile phone, a person computer, a notebook, a handheld computer, etc.).

When the first terminal is a wearable device, the second terminal is another terminal device or the second terminal is a wearable device. When the first terminal is another terminal device, a relationship between the wearable device and the another terminal device may be: different subscriber identity module cards that use the same numbers; different terminals that use the same numbers; the wearable device uses a global subscriber identity module card and the another terminal device uses an embedded subscriber identity module card; using different numbers; and using two numbers with a binding relationship.

Optionally, before step 101, the method may further include:

receiving a first network switching request sent by the first terminal; or receiving a second network switching request sent by the second terminal.

When the first terminal needs to switch from a network connection to the network device through the second terminal to the first network connection to the network device, the first terminal may trigger network connection switching, or the second terminal may trigger network connection switching. The receiving the first network switching request sent by the first terminal is network connection switching triggered by the first terminal, and the receiving the second network switching request sent by the second terminal is network connection switching triggered by the second terminal. Herein, when the network device includes the first base station and the second base station, the first base station receives the first network switching request sent by the first terminal, or the second base station receives the second network switching request sent by the second terminal, and the first base station and the second base station can implement communication between each other.

Some embodiments of the present disclosure are exemplified below from different perspectives of triggering by the first terminal and triggering by the second terminal.

Manner 1: The first terminal sends the first network switching request, and the network device receives the first network switching request sent by the first terminal.

Herein, when the network device includes the first base station and the second base station, the first base station receives the first network switching request sent by the first terminal.

It should be noted that, the first network switching request includes at least one of the following:

A11: radio resource control (RRC) connection establishment request message.

Optionally, the first terminal sends a network switching request message to the network device, to request to establish an RRC connection to the network device.

A12: Identifier information of the first terminal.

Optionally, when the first terminal is to establish a cellular connection to the network device, the first terminal sends the first network switching request to the network device, where the first network switching request carries the identifier information of the first terminal.

A13: Message indicating that the first terminal releases the second network connection.

Optionally, when the first terminal wants to establish a cellular connection to the network device, the first terminal sends, to the network device, a message indicating that the first terminal needs to cut off or release the non-cellular connection to the second terminal.

A14: Request message for network connection switching of the first terminal, where the network connection switching includes: the first terminal needs to switch from the second network connection to the second terminal to the first network connection between the first terminal and the network device.

Optionally, the first terminal requests network connection switching from the network device, where the network connection switching herein refers to: the first terminal switches from the non-cellular connection to the second terminal to the cellular connection between the first terminal and the network device.

A15: Request message for switching a preset service from the second terminal to the first terminal.

Optionally, when the first terminal is to establish a cellular connection to the network device, the first terminal sends a request message for switching execution of the current service implemented by the first terminal and the network device through the second terminal to execution directly implemented by the first terminal and the network device. The preset service includes all or some of current services, and the current services may include a transmission service between the first terminal and the second terminal, and further may include a transmission service between the second terminal and the network device. For example, the preset service may be a voice service being executed, and a service other than a voice service, such as a data service, may be switched or may not be switched, that is, maintains a suspended state.

A16: Identifier information of the second terminal.

Optionally, when the first terminal is to establish a cellular connection to the network device, the first terminal sends the first network switching request to the network device, where the first network switching request carries the identifier information of the second terminal. The identifier information of the second terminal is: the identifier information of the second terminal associated (bound) with the first terminal.

A17: Auxiliary information sent by the second terminal to the first terminal.

Optionally, when the first terminal is to establish a cellular connection to the network device, the first terminal sends the first network switching request to the network device, where the first network switching request carries the auxiliary information sent by the second terminal to the first terminal. The auxiliary information may include configuration information or measurement information required for the second terminal to access a cellular network.

In some embodiments, step 101 may include:
sending, to the first terminal, first response information that is fed back after the first network switching request of the first terminal is received.

In some embodiments, after the network device receives the first network switching request sent by the first terminal, the network device feeds back the first response information to the first terminal. The first response information is used for the first terminal to initiate a cellular connection. That is, the first response information is a response indication sent by the network device according to the first network switching request received from the first terminal. Herein, when the network device includes the first base station and the second base station, the first base station sends the first response information to the first terminal.

It should be noted that the first response information includes at least one of the following:

B11: Answer message.

Optionally, the acknowledgment message is a request acknowledgment message, used to confirm or deny the first network switching request sent by the first terminal to the network device.

B12: Identifier information of the second terminal.

Optionally, after the network device receives the first network switching request sent by the first terminal, the network device feeds back the first response information to the first terminal, and the first response information carries the identifier information of the second terminal.

B13: Application layer configuration information of the second terminal.

Optionally, after the network device receives the first network switching request sent by the first terminal, the network device feeds back the first response information to the first terminal. The first response information carries the application layer configuration information of the second terminal, and the application layer configuration information may include an IP layer identifier such as an IP address.

B14: Access stratum configuration information of the second terminal.

Optionally, after the network device receives the first network switching request sent by the first terminal, the network device feeds back the first response information to the first terminal. The first response information carries the access stratum configuration information of the second terminal, and the access stratum configuration information may include an access network side identifier such as an RNTI.

B15: Paging message sent to the first terminal.

After the network device receives the first network switching request sent by the first terminal, the network device sends the paging message of the first terminal to the first terminal, and the paging message is used by the first terminal to initiate a cellular connection.

B16: Request message for switching a preset service from the second terminal to the first terminal.

Optionally, the network device sends a request message for switching execution of the current service implemented by the first terminal and the network device through the second terminal to execution directly implemented by the first terminal and the network device. The preset service includes all or some of current services, and the current services may include a transmission service between the first terminal and the second terminal, and further may include a transmission service between the second terminal and the network device.

B17: Indication information for instructing the second terminal to initiate RRC connection release to the network device through the first terminal.

Optionally, the network device sends first response information to the first terminal, and the first response information carries indication information for instructing the second terminal to initiate RRC connection release to the network device through the first terminal.

Manner two: The second terminal sends a second network switching request, and the network device receives the second network switching request sent by the second terminal.

Herein, when the network device includes the first base station and the second base station, the second base station receives the second network switching request sent by the second terminal. The second base station may send the second network switching request to the first base station.

It should be noted that, the second network switching request includes at least one of the following:

A21: RRC connection release request message.

Optionally, the second terminal sends, to the network device, a request message indicating that the first terminal needs to perform network switching, and the second terminal requests to release an RRC connection to the network device.

A22: Identifier information of the second terminal.

Optionally, when the first terminal is to establish a cellular connection to the network device, the second terminal sends the second network switching request to the network device, where the second network switching request carries the identifier information of the second terminal.

A23: Identifier information of the first terminal.

Optionally, the identifier information of the first terminal includes: the identifier information of the first terminal associated (bound) with the second terminal.

A24: Message indicating that the second terminal releases the second network connection.

Optionally, the second terminal sends a second network switching request to the network device, and the second network switching request carries a notification message indicating that the first terminal or the second terminal needs to cut off or release the non-cellular connection.

A25: Request message for network connection switching of the first terminal, where the network connection switching includes: switching from the second network connection to the second terminal to the first network connection between the first terminal and the network device by the first terminal.

Optionally, the second terminal requests network connection switching from the network device, where the network connection switching herein refers to: the first terminal needs to switch from the non-cellular connection to the second terminal to the cellular connection between the first terminal and the network device.

A26: Request message for switching a preset service from the second terminal to the first terminal.

Optionally, the second terminal sends a request message for switching execution of the current service implemented by the first terminal and the network device through the second terminal to execution directly implemented by the first terminal and the network device. The preset service includes all or some of current services, and the current services may include a transmission service between the first terminal and the second terminal, and further may include a transmission service between the second terminal and the network device.

A27: Auxiliary information sent by the first terminal to the second terminal.

Optionally, the second terminal sends the second network switching request to the network device, where the second network switching request carries the auxiliary information sent by the first terminal to the second terminal. The auxiliary information may include configuration information or measurement information required for the first terminal to access a cellular network.

In some embodiments, step 101 may specifically include: sending, to the first terminal, second response information that is fed back after the second network switching request of the second terminal is received.

Optionally, after the network device receives the second network switching request sent by the second terminal, the network device feeds back the second response information to the first terminal. The second response information is used for the first terminal to initiate a cellular connection. That is, the second response information is a response indication sent by the network device according to the second network switching request received from the second terminal. Herein, when the network device includes the first base station and the second base station, the first base station sends the second response information to the first terminal according to the received second network switching request.

It should be noted that the second response information includes at least one of the following:

B21: Answer message.

Optionally, the acknowledgment message is a request acknowledgment message, used to confirm or deny the second network switching request sent by the second terminal to the network device.

B22: Identifier information of the second terminal.

Optionally, after the network device receives the second network switching request sent by the second terminal, the network device feeds back the second response information to the first terminal, and the second response information carries the identification information of the second terminal.

B23: Application layer configuration information of the second terminal.

Optionally, after the network device receives the second network switching request sent by the second terminal, the network device feeds back the second response information to the first terminal. The second response information carries the application layer configuration information of the second terminal, and the application layer configuration information may include an IP layer identifier such as an IP address.

B24: Access stratum configuration information of the second terminal.

Optionally, after the network device receives the second network switching request sent by the second terminal, the network device feeds back the second response information to the first terminal. The second response information carries the access stratum configuration information of the second terminal, and the access stratum configuration information may include an access network side identifier such as an RNTI.

B25: Paging message sent to the first terminal.

After the network device receives the second network switching request sent by the second terminal, the network device sends the paging message of the first terminal to the first terminal, and the paging message is used by the first terminal to initiate a cellular connection.

B26: Request message for switching a preset service from the second terminal to the first terminal.

Optionally, the network device sends a request message for switching execution of the current service implemented by the first terminal and the network device through the second terminal to execution directly implemented by the first terminal and the network device. The preset service includes all or some of current services, and the current services may include a transmission service between the first terminal and the second terminal, and further may include a transmission service between the second terminal and the network device.

B27: Indication information for instructing the second terminal to initiate RRC connection release to the network device through the first terminal.

Optionally, the network device sends second response information to the first terminal, and the second response information carries indication information for instructing the second terminal to initiate RRC connection release to the network device through the first terminal.

B28: Indication information for network connection switching of the first terminal, where the network connection switching includes: switching from the second network connection to the second terminal to the first network connection between the first terminal and the network device by the first terminal.

Optionally, the network device sends second response information to the second terminal, where the second response information carries indication information for network connection switching, and the network connection switching herein refers to: the first terminal needs to switch from the non-cellular connection to the second terminal to the cellular connection between the first terminal and the network device.

B29: Indication information indicating that the first terminal releases the second network connection to the second terminal.

Optionally, the network device sends second response information to the second terminal, and the second response information carries indication information indicating that the first terminal cuts off or releases a non-cellular connection to the second terminal.

B30: Indication information indicating that the first terminal initiates the first network connection to the network device.

Optionally, the network device sends second response information to the second terminal, and the second response information carries indication information indicating that the first terminal initiates a cellular network connection.

B31: Indication information for instructing the second terminal to release the first network connection to the network device.

Optionally, the network device sends second response information to the second terminal, and the second response information carries indication information for instructing the second terminal to cut off or release the cellular network connection to the network device.

In some embodiments, step 101 may further include:
sending first indication information to the second terminal.

Herein, when the network device includes the first base station and the second base station, the second base station sends the first indication information to the second terminal.

It should be noted that the first indication information includes at least one of the following:

C11: Answer message.

Optionally, the acknowledgment message is a request acknowledgment message, used to confirm or deny the first network switching request sent by the first terminal to the network device, or the second network switching request sent by the second terminal to the network device.

C12: RRC connection release message.

Optionally, the network device sends the first indication information to the second terminal, to instruct the second terminal to release the RRC connection to the network device.

C13: Identifier information of the first terminal.

Optionally, the network device sends the first indication information to the second terminal, and the indication information carries the identifier information of the first terminal.

C14: Indication information indicating that the first terminal establishes the first network connection to the network device.

Optionally, the network device sends the first indication information to the second terminal, to indicate that the first terminal establishes a cellular connection to the network device.

C15: Indication information for network connection switching of the first terminal, where the network connection switching includes: switching from the second network connection to the second terminal to the first network connection between the first terminal and the network device by the first terminal.

Optionally, the network device sends the first indication information to the second terminal, to indicate that the first terminal performs network connection switching, and the network connection switching herein refers to: the first terminal needs to switch from the non-cellular connection to the second terminal to the cellular connection between the first terminal and the network device.

C16: Indication information indicating that the first terminal releases the second network connection to the second terminal.

Optionally, the network device sends the first indication information to the second terminal, to indicate that the first terminal and the second terminal cut off or release a non-cellular connection.

C17: Indication information indicating that the first terminal initiates the first network connection to the network device through the second terminal.

Optionally, the network device sends the first indication information to the second terminal, to instruct the first terminal to initiate a cellular connection to the network device through the second terminal.

C18: Request message for switching a preset service from the second terminal to the first terminal.

Optionally, the network device sends a request message for switching execution of the current service implemented by the first terminal and the network device through the second terminal to execution directly implemented by the first terminal and the network device. The preset service includes all or some of current services, and the current services may include a transmission service between the first terminal and the second terminal, and further may include a transmission service between the second terminal and the network device.

In some embodiments, step 101 may further include:

The second terminal sends second indication information to the network device, and the network device receives the second indication information sent by the second terminal.

Optionally, after the second terminal receives the first indication information sent by the network device, the second terminal may send the second indication information to the network device, and the network device receives the second indication message sent by the second terminal. Herein, when the network device includes the first base station and the second base station, the second base station receives the second indication information sent by the second terminal.

It should be noted that the second indication information includes at least one of the following:

D11: acknowledgment response message.

Optionally, the acknowledgment response message is used to confirm or deny the first indication information sent by the network device to the second terminal.

D12: RRC connection release request message.

Optionally, the second terminal sends the second indication information to the network device, and the second indication information carries a message indicating that the second terminal requests to release the RRC connection to the network device.

D13: Identifier information of the first terminal.

Optionally, the second terminal sends the second indication information to the network device, and the indication information carries the identifier information of the first terminal.

In some embodiments, step 101 may further include:

The first terminal sends RRC connection establishment information to the network device, and the network device receives the RRC connection establishment information sent by the first terminal.

Optionally, the first terminal sends the RRC connection establishment information to the network device through an uplink message in connection establishment. Herein, when the network device includes the first base station and the second base station, the first base station receives the RRC connection establishment information sent by the first terminal.

It should be noted that the RRC connection establishment information includes at least one of the following which is sent by the first terminal to the network device:

E11: Identifier information of the second terminal.

Optionally, the first terminal sends the RRC connection establishment information to the network device, and the RRC connection establishment information carries the identifier information of the second terminal.

E12: Application layer configuration information of the second terminal.

Optionally, the first terminal sends the RRC connection establishment information to the network device. The RRC connection establishment information carries the application layer configuration information of the second terminal, and the application layer configuration information may include an internet protocol (IP) layer identifier such as an IP address.

E13: Access stratum configuration information of the second terminal.

Optionally, the first terminal sends the RRC connection establishment information to the network device. The RRC connection establishment information carries the access stratum configuration information of the second terminal, and the access stratum configuration information may include an access network side identifier such as an radio network temporary identifier (RNTI).

In some embodiments, after step 101, the method may further include at least one of the following:

F11: Send, to the second terminal, third indication information for instructing the second terminal to release the first network connection to the network device.

Optionally, the network device sends the third indication information to the second terminal, to instruct the second terminal to release the cellular connection to the network device. Herein, when the network device includes the first base station and the second base station, the second base station sends the third indication information to the second terminal.

F12: Send, to the second terminal, indication information indicating that the first terminal and the network device establish the first network connection.

Optionally, the network device sends the third indication information to the second terminal, and the third indication information carries information indicating that the first terminal already establishes the cellular network connection to the network device. Herein, when the network device includes the first base station and the second base station, the second base station sends, to the second terminal, indication information indicating that the first terminal and the first base station establish the first network connection.

F13: Receive RRC connection release request information sent by the second terminal.

Optionally, the second terminal sends the RRC connection release request information to the network device, to request to release the RRC connection to the network device. Herein, when the network device includes the first base station and the second base station, the second base station receives the RRC connection release request information sent by the second terminal.

F14: Send, to the second terminal, indication information for instructing the second terminal to release the first network connection to the network device.

Optionally, the indication information for instructing the second terminal to release the cellular network connection to the network device is sent to the second terminal, and the network device can directly cut off or release the cellular network connection to the second terminal. Herein, when the network device includes the first base station and the second base station, the second base station sends, to the second terminal, the indication information for instructing the second terminal to release the first network connection to the network device.

It should be noted that, in the embodiments of the present disclosure, the identifier information of the terminal may include: a user equipment identifier (UE_ID), an international mobile subscriber identity (IMSI), an international mobile equipment identity (IMEI), a subscriber identification module (SIM) identifier, an S-temporary mobile subscription identifier (S-TMSI), a 5G-S-TMSI, an RNTI, etc.

In the embodiments of the present disclosure, in a case that a first terminal establishes a network connection to the network device through a second terminal, a first network connection to the first terminal is established, and the second terminal is instructed to release a second network connection to the first terminal. When the first terminal needs to perform network switching, continuity of a service in a connected state is ensured.

Figure 2:
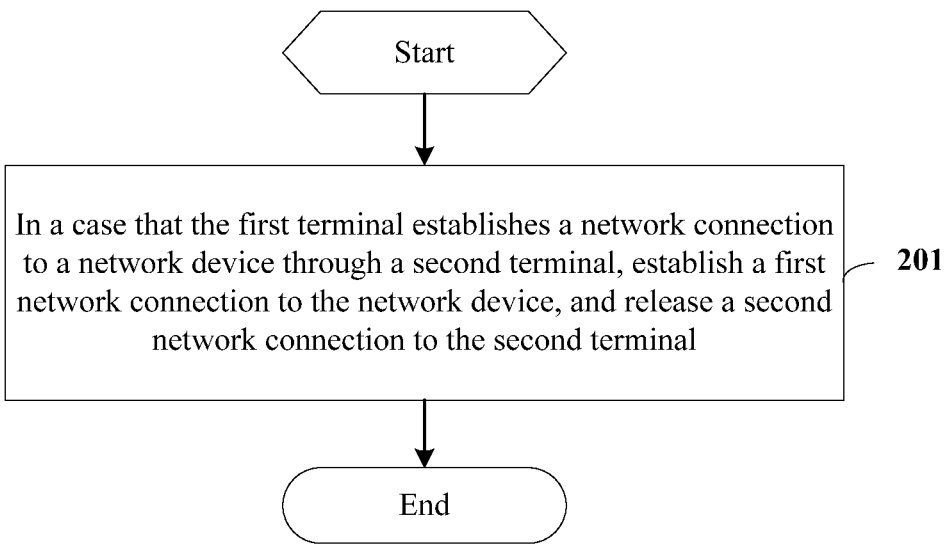
FIG. 2 is a schematic flowchart 2 of a network switching method according to some embodiments of the present disclosure.

As shown in FIG. 2, some embodiments of the present disclosure further provide a network switching method, applied to a first terminal. The method includes:

Step 201: In a case that the first terminal establishes a network connection to a network device through a second terminal, establish a first network connection to the network device, and release a second network connection to the second terminal.

It should be noted that, in the embodiments of the present disclosure, the network device may be a same base station, or may include two different base stations, that is, a first base station and a second base station. The first base station and the second base station can communicate with each other. When the network device is a same base station, the base station may establish the first network connection to each of the first terminal and the second terminal, and the base station may implement information exchange with the first terminal or the second terminal such as send a request, receive a response, or receive an indication.

When the network device includes a first base station and a second base station, the first terminal is connected to the first base station through a first network, the first base station and the first terminal implement information exchange such as send a request, receive a response, or receive an indication, the second terminal is connected to the second base station through the first network, and the second base station and the second terminal implement information exchange such as send a request, receive a response, or receive an indication.

It should be noted that, in a case that the first terminal performs the non-cellular network connection to the second terminal and the second terminal performs the cellular network connection to the network device, the network device establishes the non-cellular network connection to the first terminal, and the first terminal releases the non-cellular network connection to the second terminal. This can ensure service continuity when the first terminal switches from the non-cellular network connection to the cellular connection to the network device.

In some embodiments, before step 201, the method may further include:
sending a first network switching request to the network device.

Optionally, the first network switching request includes at least one of the following:
a RRC connection establishment request message;
identifier information of the first terminal;
a message indicating that the first terminal releases the second network connection;
a request message for network connection switching of the first terminal, where the network connection switching includes: switching from the second network connection to the second terminal to the first network connection between the first terminal and the network device by the first terminal;
a request message for switching a preset service from the second terminal to the first terminal;
identifier information of the second terminal; or
auxiliary information sent by the second terminal to the first terminal.

In some embodiments, step 201 may include:
receiving first response information that is fed back by the network device after the network device receives the first network switching request of the first terminal; or
receiving second response information that is fed back by the network device after the network device receives the second network switching request of the second terminal.

Optionally, the first response information includes at least one of the following:
an acknowledgment message;
identifier information of the second terminal;
application layer configuration information of the second terminal;
access stratum configuration information of the second terminal;
a paging message sent to the first terminal;
a request message for switching a preset service from the second terminal to the first terminal; or
indication information for instructing the second terminal to initiate RRC connection release to the network device through the first terminal.

Optionally, the second response information includes at least one of the following:
an acknowledgment message;
identifier information of the second terminal;
application layer configuration information of the second terminal;
access stratum configuration information of the second terminal;
a paging message sent to the first terminal;
a request message for switching a preset service from the second terminal to the first terminal;
indication information for instructing the second terminal to initiate RRC connection release to the network device through the first terminal;
indication information for network connection switching of the first terminal, where the network connection switching includes: switching from the second network connection to the second terminal to the first network connection between the first terminal and the network device by the first terminal;
indication information for instructing the first terminal to release the second network connection to the second terminal;
indication information for instructing the first terminal to initiate the first network connection to the network device; or
indication information for instructing the second terminal to release the first network connection to the network device.

Optionally, the second network switching request includes at least one of the following:
a RRC connection release request message;
identifier information of the second terminal;
identifier information of the first terminal, where the identifier information includes: the identifier information of the first terminal associated (bound) with the second terminal;

a message indicating that the second terminal releases the second network connection;

a request message for network connection switching of the first terminal, where the network connection switching includes: switching from the second network connection to the second terminal to the first network connection between the first terminal and the network device the first terminal;

a request message for switching a preset service from the second terminal to the first terminal; or auxiliary information sent by the first terminal to the second terminal.

Optionally, before step 201, the method may further include:

measuring a reference signal of a first network; or obtaining network measurement information of the second terminal related to the first network, where the network measurement information includes: a measurement result or a measurement configuration or a measurement reference signal configuration, etc.

In some embodiments, the measuring a reference signal of a first network includes:

in a case that a first preset condition is met, measuring the reference signal of the first network;

where the first preset condition may include at least one of the following:

G11: The second network connection between the first terminal and the second terminal is released.

Optionally, when the first terminal obtains through measurement that the non-cellular network connection to the second terminal is cut off or released, the first terminal measures the reference signal of the first network.

G12: A user operation or a higher layer instructs the first terminal to switch from the second network connection to the second terminal to the first network connection between the first terminal and the network device.

Optionally, when a user operation or an upper layer (including an application layer) triggers the first terminal to switch from the non-cellular network connection to the second terminal to the cellular network connection between the first terminal and the network device, the first terminal measures the reference signal of the first network.

G13: The first terminal detects that a signal of the second network connection to the second terminal is less than or equal to a preset signal value.

Optionally, the preset signal value is a specified condition limit indicating that network switching is required in a case of a weak network connection signal. When the first terminal detects that a signal of the non-cellular network connection to the second terminal is less than or equal to the preset signal value, it indicates that the signal of the non-cellular network connection is weak and network switching is required.

G14: The first terminal detects that a distance from the second terminal is greater than or equal to a preset distance.

Optionally, the preset distance is a specified condition limit indicating that the two terminals are far away from each other and network switching is required. When the first terminal detects that the distance from the second terminal is greater than or equal to the preset distance, it indicates that the two terminals are far away from each other and network switching is required.

G15: The first terminal detects that a preset service with the second terminal is interrupted.

Optionally, when the first terminal detects that the preset service with the second terminal is interrupted, the first terminal measures the reference signal of the first network. The preset service includes all or some of current services.

In some embodiments, the obtaining network measurement information of the second terminal related to the first network includes:

receiving the network measurement information of the second terminal related to the first network that is fed back by the second terminal in a case that a second preset condition is met;

where the second preset condition includes at least one of the following:

H11: The second terminal and the first terminal release the second network connection.

Optionally, when the second terminal obtains through measurement that the non-cellular network connection to the first terminal is cut off or released, the second terminal feeds back network measurement information of the second terminal related to the first terminal.

H12: A user operation or a higher layer instructs the second terminal to trigger the first terminal to switch from the second network connection to the second terminal to the first network connection between the first terminal and the network device.

Optionally, when a user operation or an upper layer (including an application layer) triggers the second terminal to switch from the non-cellular network connection to the first terminal to the cellular network connection between the first terminal and the network device, the second terminal feeds back the network measurement information of the second terminal related to the first terminal.

H13: The second terminal detects that a signal of the second network connection to the first terminal is less than or equal to a preset signal value.

Optionally, the preset signal value is a specified condition limit indicating that network switching is required in a case of a weak network connection signal. When the second terminal detects that a signal of the non-cellular network connection to the first terminal is less than or equal to the preset signal value, it indicates that the signal of the non-cellular network connection is weak. To ensure service continuity, the first terminal needs to perform network switching.

H14: The second terminal detects that a distance from the first terminal is greater than or equal to a preset distance.

Optionally, the preset distance is a specified condition limit indicating that the two terminals are far away from each other and network switching is required. When the second terminal detects that the distance from the first terminal is greater than or equal to the preset distance, it indicates that the two terminals are far away from each other. To ensure service continuity, the first terminal needs to perform network switching.

H15: The second terminal detects that a preset service with the first terminal is interrupted.

Optionally, when the second terminal detects that the preset service with the first terminal is interrupted, the second terminal feeds back the network measurement information of the second terminal related to the first network. The preset service includes all or some of current services.

Optionally, before step 201, the method may further include:

receiving fourth indicating information sent by the second terminal.

Optionally, the fourth indication information includes at least one of the following:
- identifier information of the second terminal;
- application layer configuration information of the second terminal;
- access stratum configuration information of the second terminal; or
- indication information for instructing the first terminal to initiate the first network connection to the network device.

In some embodiments, step 201 may include:
- sending RRC connection establishment information to the network device.

Optionally, the RRC connection establishment information includes at least one of the following which is sent by the first terminal to the network device:
- identifier information of the second terminal;
- application layer configuration information of the second terminal; or
- access stratum configuration information of the second terminal.

Optionally, the first network connection refers to that the first terminal or the second terminal is connected to or camps on or non-activated with a cellular network for the network device.

The second network connection is a non-cellular network connection between the first terminal and the second terminal.

Optionally, the first terminal and the second terminal have a binding relationship, so that multiple terminals with a binding relationship can be found through paging at a same time. The binding relationship between terminals refers to a binding relationship between IDs of the terminals, or subscriber identification module (SIM) cards or embedded SIM (eSIM) cards or universal subscriber identity (USIM) cards or corresponding numbers of the terminals have a binding relationship. The binding relationship can be obtained by the base station from a core network entity, or obtained through reporting by the terminal.

It should be noted that, when the first terminal sends the identifier information of the second terminal to the network device, the identifier information of the second terminal may be the identifier information of the second terminal bound to the first terminal.

It should be noted that all descriptions of the first terminal in the foregoing embodiments are applicable to the embodiments of the network switching method, and a same technical effect can also be achieved.

In some embodiments of the present disclosure, in a case that the first terminal performs the non-cellular network connection to the second terminal and the second terminal performs the cellular network connection to the network device, the network device establishes the non-cellular network connection to the first terminal, and the first terminal releases the non-cellular network connection to the second terminal. This can ensure service continuity when the terminal switches from a non-cellular network connection to a cellular connection to the network device.

Figure 3:
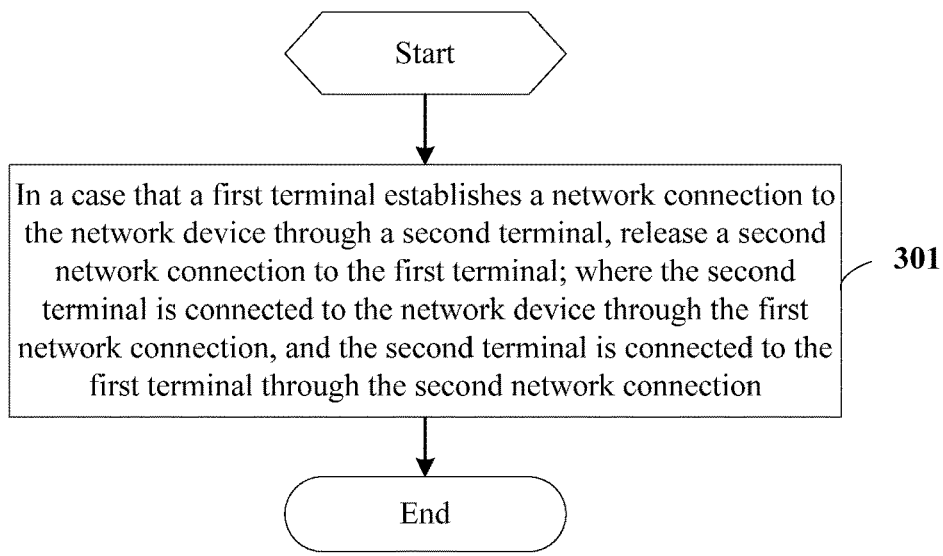
FIG. 3 is a schematic flowchart 3 of a network switching method according to some embodiments of the present disclosure.

As shown in FIG. 3, some embodiments of the present disclosure further provide a network switching method, applied to a second terminal. The method includes:

Step 301: In a case that a first terminal establishes a network connection to the network device through a second terminal, release a second network connection to the first terminal.

The second terminal is connected to the network device through the first network connection, and the second terminal is connected to the first terminal through the second network connection.

It should be noted that, in the embodiments of the present disclosure, the network device may be a same base station, or may include two different base stations, that is, a first base station and a second base station. The first base station and the second base station can communicate with each other. When the network device is a same base station, the base station may establish the first network connection to each of the first terminal and the second terminal, and the base station may implement information exchange with the first terminal or the second terminal such as send a request, receive a response, or receive an indication.

When the network device includes a first base station and a second base station, the first terminal is connected to the first base station through a first network, the first base station and the first terminal implement information exchange such as send a request, receive a response, or receive an indication, the second terminal is connected to the second base station through the first network, and the second base station and the second terminal implement information exchange such as send a request, receive a response, or receive an indication.

It should be noted that, in a case that the first terminal performs the non-cellular network connection to the second terminal and the second terminal performs the cellular network connection to the network device, the network device establishes the non-cellular network connection to the first terminal, and the second terminal releases the non-cellular network connection to the first terminal. This can ensure service continuity when the terminal switches from the non-cellular network connection to the cellular connection to the network device.

Optionally, before step 301, the method may further include:
- sending a second network switching request to the network device.

Optionally, the second network switching request includes at least one of the following:
- a RRC connection release request message;
- identifier information of the second terminal;
- identifier information of the first terminal;
- a message indicating that the second terminal releases the second network connection;
- a request message for network connection switching of the first terminal, where the network connection switching includes: switching from the second network connection to the second terminal to the first network connection between the first terminal and the network device by the first terminal;
- a request message for switching a preset service from the second terminal to the first terminal; or
- auxiliary information sent by the first terminal to the second terminal.

Optionally, before step 301, the method may further include:
- feeding back network measurement information of the second terminal related to the first terminal in a case that a second preset condition is met;
- where the second preset condition includes at least one of the following:
  - releasing the second network connection by the second terminal and the first terminal;
  - instructing the second terminal to trigger the first terminal to switch from the second network connection to the second terminal to the first network connection between the first terminal and the network device by a user operation or a higher layer;

detecting that a signal of the second network connection to the first terminal is less than or equal to a preset signal value by the second terminal;

detecting that a distance from the first terminal is greater than or equal to a preset distance by the second terminal; or detecting that a preset service with the first terminal is interrupted by the second terminal.

In some embodiments, step 301 may include:

receiving first indication information sent by the network device.

Optionally, the first indication information includes at least one of the following:

an acknowledgment message;

a RRC connection release message;

identifier information of the first terminal;

indication information indicating that the first terminal establishes the first network connection to the network device;

indication information for network connection switching of the first terminal, where the network connection switching includes: switching from the second network connection to the second terminal to the first network connection between the first terminal and the network device the first terminal;

indication information indicating that the first terminal releases the second network connection to the second terminal;

indication information indicating that the first terminal initiates the first network connection to the network device through the second terminal; or a request message for switching a preset service from the second terminal to the first terminal.

In some embodiments, step 301 may include:

sending second indication information to the network device.

Optionally, the second indication information includes at least one of the following:

an acknowledgment response message;

a RRC connection release request message; or identifier information of the first terminal.

In some embodiments, the method may further include:

receiving third indication information that is sent by the network device and that is for instructing the second terminal to release the first network connection to the network device;

receiving indication information that is sent by the network device and that indicates that the first terminal and the network device establish the first network connection;

sending RRC connection release request information to the network device; and receiving indication information that is sent by the network device and that is for instructing the second terminal to release the first network connection to the network device.

Optionally, before step 301, the method may further include:

sending fourth indication information to the first terminal.

Optionally, the fourth indication information includes at least one of the following:

identifier information of the second terminal;

application layer configuration information of the second terminal;

access stratum configuration information of the second terminal; or indication information for instructing the first terminal to initiate the first network connection to the network device.

Optionally, the first network connection refers to that the first terminal or the second terminal is connected to or camps on or non-activated with a cellular network for the network device.

The second network connection is a non-cellular network connection between the first terminal and the second terminal.

It should be noted that all descriptions of the second terminal in the foregoing embodiments are applicable to the embodiments of the network switching method, and a same technical effect can also be achieved.

In some embodiments of the present disclosure, in a case that the first terminal performs the non-cellular network connection to the second terminal and the second terminal performs the cellular network connection to the network device, the network device establishes the non-cellular network connection to the first terminal, and the second terminal releases the non-cellular network connection to the first terminal. This can ensure service continuity when the terminal switches from a non-cellular network connection to a cellular connection to the network device.

Figure 4:
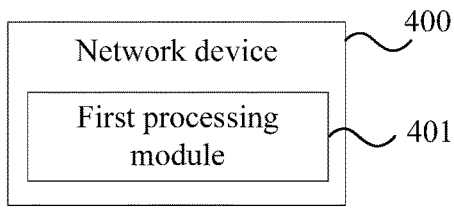
FIG. 4 is a schematic diagram of modules of a network device according to some embodiments of the present disclosure.

As shown in FIG. 4, some embodiments of the present disclosure further provide a network device 400, including:

a first processing module 401, configured to: in a case that a first terminal establishes a network connection to the network device through a second terminal, establish a first network connection to the first terminal, and instruct the second terminal to release a second network connection to the first terminal.

Optionally, the network device 400 further includes:

a first receiving module, configured to receive a first network switching request sent by the first terminal; or receive a second network switching request sent by the second terminal.

Optionally, the first network switching request includes at least one of the following:

a RRC connection establishment request message;

identifier information of the first terminal;

a message indicating that the first terminal releases the second network connection;

a request message for network connection switching of the first terminal, where the network connection switching includes: switching from the second network connection to the second terminal to the first network connection between the first terminal and the network device by the first terminal;

a request message for switching a preset service from the second terminal to the first terminal;

identifier information of the second terminal; or auxiliary information sent by the second terminal to the first terminal.

Optionally, the second network switching request includes at least one of the following:

a RRC connection release request message;

identifier information of the second terminal;

identifier information of the first terminal;

a message indicating that the second terminal releases the second network connection;

a request message for network connection switching of the first terminal, where the network connection switching includes: switching from the second network connection to the second terminal to the first network connection between the first terminal and the network device by the first terminal;

a request message for switching a preset service from the second terminal to the first terminal; or auxiliary information sent by the first terminal to the second terminal.

Optionally, the first processing module 401 is configured to:

send, to the first terminal, first response information that is fed back after the first network switching request of the first terminal is received; or send, to the first terminal, second response information that is fed back after the second network switching request of the second terminal is received.

Optionally, the first response information includes at least one of the following:

an acknowledgment message;

identifier information of the second terminal;

application layer configuration information of the second terminal;

access stratum configuration information of the second terminal;

a paging message sent to the first terminal;

a request message for switching a preset service from the second terminal to the first terminal; or indication information for instructing the second terminal to initiate RRC connection release to the network device through the first terminal.

Optionally, the second response information includes at least one of the following:

an acknowledgment message;

identifier information of the second terminal;

application layer configuration information of the second terminal;

access stratum configuration information of the second terminal;

a paging message sent to the first terminal;

a request message for switching a preset service from the second terminal to the first terminal;

indication information for instructing the second terminal to initiate RRC connection release to the network device through the first terminal;

indication information for network connection switching of the first terminal, where the network connection switching includes: switching from the second network connection to the second terminal to the first network connection between the first terminal and the network device by the first terminal;

indication information for instructing the first terminal to release the second network connection to the second terminal;

indication information for instructing the first terminal to initiate the first network connection to the network device; or indication information for instructing the second terminal to release the first network connection to the network device.

Optionally, the first processing module 401 is configured to:

send first indication information to the second terminal.

Optionally, the first indication information includes at least one of the following:

an acknowledgment message;

a RRC connection release message;

identifier information of the first terminal;

indication information indicating that the first terminal establishes the first network connection to the network device;

indication information for network connection switching of the first terminal, where the network connection switching includes: switching from the second network connection to the second terminal to the first network connection between the first terminal and the network device by the first terminal;

indication information indicating that the first terminal releases the second network connection to the second terminal;

indication information indicating that the first terminal initiates the first network connection to the network device through the second terminal; or a request message for switching a preset service from the second terminal to the first terminal.

Optionally, the first processing module 401 is configured to:

receive second indicating information sent by the second terminal.

Optionally, the second indication information includes at least one of the following:

an acknowledgment response message;

a RRC connection release request message; or identifier information of the first terminal.

Optionally, the first processing module 401 is configured to:

receive RRC connection establishment information sent by the first terminal.

Optionally, the RRC connection establishment information includes sending, by the first terminal, at least one of the following to the network device:

identifier information of the second terminal;

application layer configuration information of the second terminal; or access stratum configuration information of the second terminal.

Optionally, the network device 400 further includes at least one of the following:

a first sending module, configured to send, to the second terminal, third indication information for instructing the second terminal to release the first network connection to the network device;

a second sending module, configured to send, to the second terminal, indication information indicating that the first terminal and the network device establish the first network connection;

a second receiving module, configured to receive RRC connection release request information sent by the second terminal; or a third sending module, configured to send, to the second terminal, indication information for instructing the second terminal to release the first network connection to the network device.

Optionally, the first network connection refers to that the first terminal or the second terminal is connected to or camps on or non-activated with a cellular network for the network device.

The second network connection is a non-cellular network connection between the first terminal and the second terminal.

It should be noted that this embodiment of the network device provides the network device corresponding to the network switching method applied to the network device, all implementations in the foregoing embodiments are applicable to this embodiment of the network device, and the same technical effect thereof can be achieved.

Some embodiments of the present disclosure further provide a network device, including a memory, a processor, and a computer program stored in the memory and executable on the processor. When the computer program is executed by the processor, each process of the embodiment of the network switching method applied to the network device can be implemented, and a same technical effect can be achieved. To avoid repetition, details are not described herein.

Figure 5:
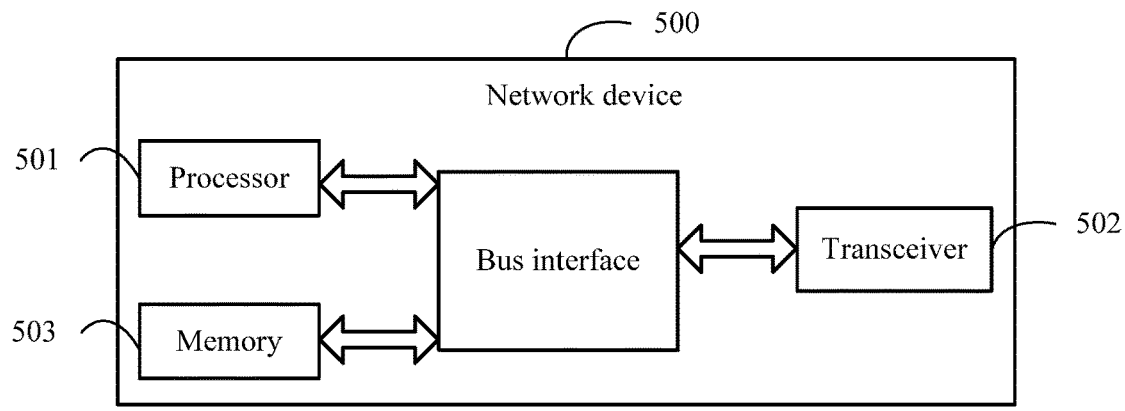
FIG. 5 is a structural block diagram of a network device according to some embodiments of the present disclosure.

FIG. 5 is a structural diagram of a network device according to an embodiment of the present disclosure. The network device can implement details of the network switching method, and a same effect can be achieved. As shown in FIG. 5, a network device 500 includes: a processor 501, a transceiver 502, a memory 503, and a bus interface.

The processor 501 is configured to read a program in the memory 503 and perform the following process:

in a case that a first terminal establishes a network connection to the network device through a second terminal, establishing a first network connection to the first terminal, and instructing the second terminal to release a second network connection to the first terminal.

In FIG. 5, a bus architecture may include any quantity of interconnected buses and bridges, which may be connected together by various circuits of one or more processors represented by the processor 501 and a memory represented by the memory 503. The bus architecture may further link various other circuits such as a peripheral device, a voltage regulator, and a power management circuit together. These are all well-known in the art, and therefore are not further described in this specification. The bus interface provides an interface. The transceiver 502 may be a plurality of elements, in other words, includes a transmitter and a receiver, and provides a unit configured to communicate with various other apparatuses on a transmission medium.

Optionally, the processor 501 is configured to read a program in the memory 503 to perform the following process:

receiving a first network switching request sent by the first terminal; or receiving a second network switching request sent by the second terminal.

Optionally, the first network switching request includes at least one of the following:

a RRC connection establishment request message;

identifier information of the first terminal;

a message indicating that the first terminal releases the second network connection;

a request message for network connection switching of the first terminal, where the network connection switching includes: switching from the second network connection to the second terminal to the first network connection between the first terminal and the network device by the first terminal;

a request message for switching a preset service from the second terminal to the first terminal;

identifier information of the second terminal; or auxiliary information sent by the second terminal to the first terminal.

Optionally, the second network switching request includes at least one of the following:

a RRC connection release request message;

identifier information of the second terminal;

identifier information of the first terminal;

a message indicating that the second terminal releases the second network connection;

a request message for network connection switching of the first terminal, where the network connection switching includes: switching from the second network connection to the second terminal to the first network connection between the first terminal and the network device by the first terminal;

a request message for switching a preset service from the second terminal to the first terminal; or auxiliary information sent by the first terminal to the second terminal.

Optionally, the processor 501 is configured to read a program in the memory 503 to perform the following process:

sending, to the first terminal, first response information that is fed back after the first network switching request of the first terminal is received; or sending, to the first terminal, second response information that is fed back after the second network switching request of the second terminal is received.

Optionally, the first response information includes at least one of the following:

an acknowledgment message;

identifier information of the second terminal;

application layer configuration information of the second terminal;

access stratum configuration information of the second terminal;

a paging message sent to the first terminal;

a request message for switching a preset service from the second terminal to the first terminal; or indication information for instructing the second terminal to initiate RRC connection release to the network device through the first terminal.

Optionally, the second response information includes at least one of the following:

an acknowledgment message;

identifier information of the second terminal;

application layer configuration information of the second terminal;

access stratum configuration information of the second terminal;

a paging message sent to the first terminal;

a request message for switching a preset service from the second terminal to the first terminal;

indication information for instructing the second terminal to initiate RRC connection release to the network device through the first terminal;

indication information for network connection switching of the first terminal, where the network connection switching includes: switching from the second network connection to the second terminal to the first network connection between the first terminal and the network device by the first terminal;

indication information for instructing the first terminal to release the second network connection to the second terminal;

indication information for instructing the first terminal to initiate the first network connection to the network device; or indication information for instructing the second terminal to release the first network connection to the network device.

Optionally, the processor 501 is configured to read a program in the memory 503 to perform the following process:
    sending first indication information to the second terminal.

Optionally, the first indication information includes at least one of the following:
    an acknowledgment message;
    a RRC connection release message;
    identifier information of the first terminal;
    indication information indicating that the first terminal establishes the first network connection to the network device;
    indication information for network connection switching of the first terminal, where the network connection switching includes: switching from the second network connection to the second terminal to the first network connection between the first terminal and the network device by the first terminal;
    indication information indicating that the first terminal releases the second network connection to the second terminal;
    indication information indicating that the first terminal initiates the first network connection to the network device through the second terminal; or
    a request message for switching a preset service from the second terminal to the first terminal.

Optionally, the processor 501 is configured to read a program in the memory 503 to perform the following process:
    receiving second indicating information sent by the second terminal.

Optionally, the second indication information includes at least one of the following:
    an acknowledgment response message;
    a RRC connection release request message; or
    identifier information of the first terminal.

Optionally, the processor 501 is configured to read a program in the memory 503 to perform the following process:
    receiving RRC connection establishment information sent by the first terminal.

In some embodiments, the RRC connection establishment information includes at least one of the following which is sent by the first terminal to the network device:
    identifier information of the second terminal;
    application layer configuration information of the second terminal; or
    access stratum configuration information of the second terminal.

Optionally, the processor 501 is configured to read a program in the memory 503 to perform the following process:
    sending, to the second terminal, third indication information for instructing the second terminal to release the first network connection to the network device;
    sending, to the second terminal, indication information indicating that the first terminal and the network device establish the first network connection;
    receiving RRC connection release request information sent by the second terminal; and
    sending, to the second terminal, indication information for instructing the second terminal to release the first network connection to the network device.

Optionally, the first network connection refers to that the first terminal or the second terminal is connected to or camps on or non-activated with a cellular network for the network device.

The second network connection is a non-cellular network connection between the first terminal and the second terminal.

The network device may be a base transceiver station (BTS) in global system for mobile communications (GSM) or code division multiple access (CDMA), or may be a NodeB (NB) in wideband code division multiple access (WCDMA), or may be an evolved NodeB (eNB or eNodeB) in LTE, or a relay station or an access point, or a base station in a future 5G network, which is not limited herein.

Some embodiments of the present disclosure further provide a non-transitory computer-readable storage medium. The non-transitory computer-readable storage medium stores a computer program, and when a processor executes the computer program, the foregoing processes of the embodiment of the network switching method applied to the network device are implemented and a same technical effect can be achieved. To avoid repetition, details are not described herein again. The non-transitory computer-readable storage medium is, for example, a read-only memory (ROM), a random access memory (RAM), a magnetic disk, or an optical disc.

Figure 6:
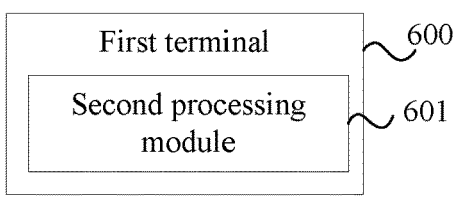
FIG. 6 is a schematic diagram of modules of a first terminal according to some embodiments of the present disclosure.

As shown in FIG. 6, some embodiments of the present disclosure further provide a terminal, where the terminal is a first terminal 600 and includes:
    a second processing module 601, configured to: in a case that the first terminal establishes a network connection to a network device through a second terminal, establish a first network connection to the network device, and release a second network connection to the second terminal.

Optionally, the terminal further includes:
    a fourth sending module, configured to send a first network switching request to the network device.

Optionally, the first network switching request includes at least one of the following:
    a RRC connection establishment request message;
    identifier information of the first terminal;
    a message indicating that the first terminal releases the second network connection;
    a request message for network connection switching of the first terminal, where the network connection switching includes: switching from the second network connection to the second terminal to the first network connection between the first terminal and the network device by the first terminal;
    a request message for switching a preset service from the second terminal to the first terminal;
    identifier information of the second terminal; or
    auxiliary information sent by the second terminal to the first terminal.

Optionally, the second processing module 601 includes:
    receiving first response information that is fed back by the network device after the network device receives the first network switching request of the first terminal; or
    receiving second response information that is fed back by the network device after the network device receives the second network switching request of the second terminal.

Optionally, the first response information includes at least one of the following:
an acknowledgment message
identifier information of the second terminal;
application layer configuration information of the second terminal;
access stratum configuration information of the second terminal;
a paging message sent to the first terminal;
a request message for switching a preset service from the second terminal to the first terminal; or
indication information for instructing the second terminal to initiate RRC connection release to the network device through the first terminal.

Optionally, the second response information includes at least one of the following:
an acknowledgment message;
identifier information of the second terminal;
application layer configuration information of the second terminal;
access stratum configuration information of the second terminal;
a paging message sent to the first terminal;
a request message for switching a preset service from the second terminal to the first terminal;
indication information for instructing the second terminal to initiate RRC connection release to the network device through the first terminal;
indication information for network connection switching of the first terminal, where the network connection switching includes: switching from the second network connection to the second terminal to the first network connection between the first terminal and the network device by the first terminal;
indication information for instructing the first terminal to release the second network connection to the second terminal;
indication information for instructing the first terminal to initiate the first network connection to the network device; or
indication information for instructing the second terminal to release the first network connection to the network device.

Optionally, the second network switching request includes at least one of the following:
a RRC connection release request message;
identifier information of the second terminal;
identifier information of the first terminal;
a message indicating that the second terminal releases the second network connection;
a request message for network connection switching of the first terminal, where the network connection switching includes: switching from the second network connection to the second terminal to the first network connection between the first terminal and the network device by the first terminal;
a request message for switching a preset service from the second terminal to the first terminal; or
auxiliary information sent by the first terminal to the second terminal.

Optionally, the terminal further includes:
a first obtaining module, configured to measure a reference signal of a first network; or
obtain network measurement information of the second terminal related to the first network.

Optionally, the second processing module 601 is configured to:
in a case that a first preset condition is met, measure the reference signal of the first network;
where the first preset condition includes at least one of the following:
the second network connection between the first terminal and the second terminal being released;
instructing the first terminal to switch from the second network connection to the second terminal to the first network connection between the first terminal and the network device by a user operation or a higher layer;
detecting that a signal of the second network connection to the second terminal is less than or equal to a preset signal value by the first terminal;
detecting that a distance from the second terminal is greater than or equal to a preset distance by the first terminal; or
detecting that a preset service with the second terminal is interrupted by the first terminal.

Optionally, the second processing module 601 is configured to:
receive the network measurement information of the second terminal related to the first network that is fed back by the second terminal in a case that a second preset condition is met;
where the second preset condition includes at least one of the following:
releasing the second network connection by the second terminal and the first terminal;
instructing the second terminal to trigger the first terminal to switch from the second network connection to the second terminal to the first network connection between the first terminal and the network device by a user operation or a higher layer;
detecting that a signal of the second network connection to the first terminal is less than or equal to a preset signal value by the second terminal;
detecting that a distance from the first terminal is greater than or equal to a preset distance by the second terminal; or
detecting that a preset service with the first terminal is interrupted by the second terminal.

Optionally, the terminal further includes:
a third receiving module, configured to receive fourth indicating information sent by the second terminal.

Optionally, the fourth indication information includes at least one of the following:
identifier information of the second terminal;
application layer configuration information of the second terminal;
access stratum configuration information of the second terminal; or
indication information for instructing the first terminal to initiate the first network connection to the network device.

Optionally, the second processing module 601 is configured to:
send RRC connection establishment information to the network device.

Optionally, the RRC connection establishment information includes at least one of the following which is sent by the first terminal to the network device:
identifier information of the second terminal;
application layer configuration information of the second terminal; or
access stratum configuration information of the second terminal.

Optionally, the first network connection refers to that the first terminal or the second terminal is connected to or camps on or non-activated with a cellular network for the network device.

The second network connection is a non-cellular network connection between the first terminal and the second terminal.

It should be noted that this terminal embodiment is a terminal corresponding to the foregoing network switching method applied to the first terminal. All implementations of the foregoing embodiment are applicable to this terminal embodiment, and a same technical effect can also be achieved.

Figure 7:
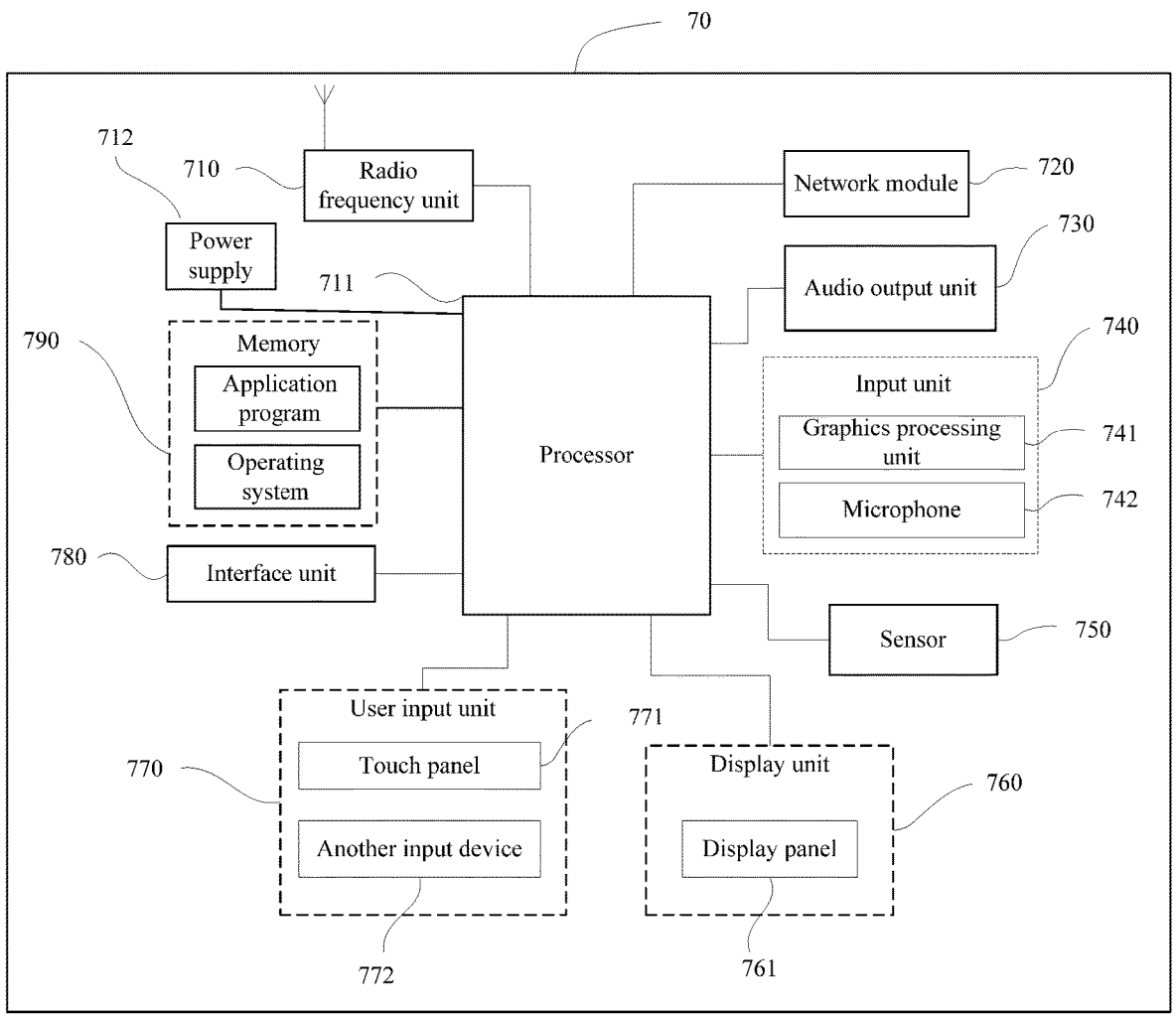
FIG. 7 is a structural block diagram of a first terminal according to some embodiments of the present disclosure.

FIG. 7 is a schematic diagram of a hardware structure of a terminal implementing some embodiments of the present disclosure. The terminal is a first terminal.

The first terminal 70 includes but is not limited to: components such as a radio frequency unit 710, a network module 720, an audio output unit 730, an input unit 740, a sensor 750, a display unit 760, a user input unit 770, an interface unit 780, a memory 790, a processor 711, and a power supply 712. Those skilled in the art may understand that the terminal structure shown in FIG. 7 does not constitute a limitation on the terminal. The terminal may include more or fewer components than those shown in the figure, or some components may be combined, or there may be a different component arrangement. In some embodiments of the present disclosure, the terminal includes but is not limited to a mobile phone, a tablet computer, a notebook computer, a palmtop computer, an in-vehicle terminal, a wearable device, a pedometer, and the like.

The processor 711 is configured to: in a case that the first terminal establishes a network connection to a network device through a second terminal, establish a first network connection to the network device, and release a second network connection to the second terminal.

It should be understood that in some embodiments of this disclosure, the radio frequency unit 710 may be configured to receive and send signals in a process of receiving and sending information or calling. For example, the radio frequency unit receives downlink data from a network device for processing by the processor 711, and sends uplink data to the network device. Generally, the radio frequency unit 710 includes, but is not limited to, an antenna, at least one amplifier, a transceiver, a coupler, a low noise amplifier, a duplexer, and the like. In addition, the radio frequency unit 710 may also communicate with another device via a wireless communications system and network.

The terminal provides a user with wireless broadband Internet access by using the network module 720, for example, helping the user send and receive emails, browse web pages, and access streaming media.

The audio output unit 730 may convert audio data received by the radio frequency unit 710 or the network module 720 or stored in the memory 790 into an audio signal and output the audio signal as a sound. In addition, the audio output unit 730 may further provide audio output (for example, call signal receiving sound or message receiving sound) related to a specific function performed by the first terminal 70. The audio output unit 730 includes a loudspeaker, a buzzer, a receiver, and the like.

The input unit 740 is configured to receive an audio signal or a video signal. The input unit 740 may include a graphics processing unit (GPU) 741 and a microphone 742. The graphics processing unit 741 processes image data of a static picture or a video obtained by an image capture apparatus (such as a camera) in a video capture mode or an image capture mode. A processed image frame may be displayed on the display unit 760. An image frame processed by the graphics processing unit 741 may be stored in the memory 790 (or another storage medium) or sent by the radio frequency unit 710 or the network module 720. The microphone 742 may receive sound and can process such sound into audio data. The processed audio data may be output by being converted into a format that may be sent to a mobile communications network device by using the radio frequency unit 710 in a telephone call mode.

The first terminal 70 further includes at least one sensor 750, for example, a light sensor, a motion sensor, and other sensors. The light sensor includes an ambient light sensor and a proximity sensor. The ambient light sensor can adjust a brightness of a display panel 761 based on brightness of ambient light. The proximity sensor can close the display panel 761 and/or backlight when the first terminal 70 moves to an ear. As a type of motion sensor, an accelerometer sensor can detect magnitudes of accelerations in all directions (usually three axes), can detect a magnitude and a direction of gravity in a static state, and can be applied to terminal posture recognition (such as screen switching between portrait and landscape, related games, and magnetometer posture calibration), functions related to vibration recognition (such as pedometer and tapping), and the like. The sensor 750 may also include a fingerprint sensor, a pressure sensor, an iris sensor, a molecular sensor, a gyroscope, a barometer, a hygrometer, a thermometer, an infrared sensor, and the like. Details are not described herein.

The display unit 760 is configured to display information entered by a user or information provided for the user. The display unit 760 may include a display panel 761, and the display panel 761 may be configured in a form of a liquid crystal display (LCD), an organic light-emitting diode (OLED), or the like.

The user input unit 770 may be configured to receive input numeral or character information, and generate key signal input related to user setting and function control of the terminal. The user input unit 770 includes a touch panel 771 and another input device 772. The touch panel 771 is also referred to as a touchscreen, and may collect a touch operation performed by a user on or near the touch panel 771 (such as an operation performed by a user on the touch panel 771 or near the touch panel 771 by using any proper object or accessory, such as a finger or a stylus). The touch panel 771 may include two parts: a touch detection device and a touch controller. The touch detection apparatus detects a touch location of the user, detects a signal carried by a touch operation, and transmits the signal to the touch controller. The touch controller receives touch information from the touch detection apparatus, converts the touch information to point coordinates, and sends the point coordinates to the processor 711, and receives and executes a command sent by the processor 711. In addition, the touch panel 771 may be implemented in various types such as resistive, capacitive, infrared, and surface acoustic wave. In addition to the touch panel 771, the user input unit 770 may further include another input device 772. The another input device 772 may include, but are not limited to, a physical keyboard, functional keys (for example, a volume control key and a switch key), a trackball, a mouse, and a joystick. Details are not described herein again.

Optionally, the touch panel 771 may cover the display panel 761. When detecting the touch operation on or near the touch panel 771, the touch panel 771 transmits the touch operation to the processor 711 to determine a type of a touch event, and then the processor 711 provides corresponding visual output on the display panel 761 based on the type of the touch event. Although in FIG. 7, the touch panel 771 and the display panel 761 are configured as two independent components to implement input and output functions of the terminal, in some embodiments, the touch panel 771 and the display panel 761 can be integrated to implement the input and output functions of the terminal. Details are not limited herein.

The interface unit 780 is an interface for connecting an external apparatus to the first terminal 70. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 780 can be configured to receive an input (for example, data information and power) from the external apparatus and transmit the received input to one or more elements in the first terminal 70, or transmit data between the first terminal 70 and the external apparatus.

The memory 790 may be configured to store a software program and various data. The memory 790 may mainly include a program storage area and a data storage area. The program storage area may store an operating system, an application program (for example, a sound play function or an image play function) required for at least one function, and the like. The data storage area may store data created based on use of the mobile phone (for example, audio data and a phone book), and the like. In addition, the memory 740 may include a high-speed random access memory, and may further include a nonvolatile memory, for example, at least one disk storage device, a flash memory, or another volatile solid-state storage device.

The processor 711 is a control center of the terminal, and is connected to all parts of the entire terminal by using various interfaces and lines, and performs various functions of the terminal and processes data by running or executing the software program and/or a module that are stored in the memory 790 and invoking the data stored in the memory 790, to implement overall monitoring on the terminal. The processor 711 may include one or more processing units. Optionally, the processor 711 may be integrated with an application processor and a modem processor. The application processor mainly processes an operating system, a user interface, an application program, and the like. The modem processor mainly processes wireless communications. It should be understood that the modem processor may be not integrated in the processor 711.

The terminal 70 may further include a power supply 712 (such as a battery) that supplies power to each component. Optionally, the power supply 712 may be logically connected to the processor 711 by using a power management system, to implement functions such as charging, discharging, and power consumption management by using the power management system.

In addition, the first terminal 70 includes some function modules that are not shown. Details are not described herein.

It should also be noted that the processor 711 is further configured to implement other processes in the network switching method applied to the first terminal in the foregoing embodiment, and details are not described herein again.

Optionally, some embodiments of the present disclosure further provide a terminal. The terminal is a first terminal, further including a processor 711, a memory 790, and a computer program stored in the memory 790 and executable on the processor 711. When the computer program is executed by the processor 711, each process of the embodiment of the foregoing network switching method applied to the first terminal can be implemented, and a same technical effect can be achieved. To avoid repetition, details are not described herein.

Some embodiments of the present disclosure further provide a non-transitory computer-readable storage medium. The non-transitory computer-readable storage medium stores a computer program, and when a processor executes the computer program, the foregoing processes of the embodiment of the network switching method applied to the first terminal are implemented and a same technical effect can be achieved. To avoid repetition, details are not described herein again. The non-transitory computer-readable storage medium is, for example, a ROM, a RAM, a magnetic disk, or an optical disc.

Figure 8:
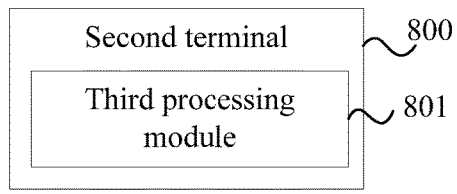
FIG. 8 is a schematic diagram of modules of a second terminal according to some embodiments of the present disclosure.

As shown in FIG. 8, some embodiments of the present disclosure provide a terminal, where the terminal is a second terminal 800 and includes:

a third processing module 801, configured to: in a case that a first terminal establishes a network connection to the network device through a second terminal, release a second network connection to the first terminal;
  where the second terminal is connected to the network device through the first network connection, and the second terminal is connected to the first terminal through the second network connection.
  Optionally, the terminal further includes:
  a fifth sending module, configured to send a second network switching request to the network device.
  Optionally, the second network switching request includes at least one of the following:
  a RRC connection release request message;
  identifier information of the second terminal;
  identifier information of the first terminal;
  a message indicating that the second terminal releases the second network connection;
  a request message for network connection switching of the first terminal, where the network connection switching includes: switching from the second network connection to the second terminal to the first network connection between the first terminal and the network device by the first terminal;
  a request message for switching a preset service from the second terminal to the first terminal; or
  auxiliary information sent by the first terminal to the second terminal.
  Optionally, the terminal further includes:
  a feedback module, configured to feed back network measurement information of the second terminal related to the first terminal in a case that a second preset condition is met;
  where the second preset condition includes at least one of the following:
  releasing the second network connection by the second terminal and the first terminal;
  instructing the second terminal to trigger the first terminal to switch from the second network connection to the second terminal to the first network connection between the first terminal and the network device by a user operation or a higher layer;
  detecting that a signal of the second network connection to the first terminal is less than or equal to a preset signal value by the second terminal;
  detecting that a distance from the first terminal is greater than or equal to a preset distance by the second terminal; or detecting that a preset service with the first terminal is interrupted by the second terminal.

Optionally, the third processing module 801 is configured to:

receive first indication information sent by the network device.

Optionally, the first indication information includes at least one of the following:

an acknowledgment message;

a RRC connection release message;

identifier information of the first terminal;

indication information indicating that the first terminal establishes the first network connection to the network device;

indication information for network connection switching of the first terminal, where the network connection switching includes: switching from the second network connection to the second terminal to the first network connection between the first terminal and the network device by the first terminal;

indication information indicating that the first terminal releases the second network connection to the second terminal;

indication information indicating that the first terminal initiates the first network connection to the network device through the second terminal; or a request message for switching a preset service from the second terminal to the first terminal.

Optionally, the third processing module 801 is configured to:

send second indication information to the network device.

Further, the second indication information includes at least one of the following:

an acknowledgment response message;

a RRC connection release request message; or identifier information of the first terminal.

Optionally, the terminal further includes:

a fourth receiving module, configured to receive third indication information that is sent by the network device and that is for instructing the second terminal to release the first network connection to the network device;

a fifth receiving module, configured to receive indication information that is sent by the network device and that indicates that the first terminal and the network device establish the first network connection;

a sixth sending module, configured to send RRC connection release request information to the network device; and a sixth receiving module, configured to receive indication information that is sent by the network device and that is for instructing the second terminal to release the first network connection to the network device.

Optionally, the terminal further includes:

a seventh sending module, configured to send fourth indication information to the first terminal.

Optionally, the fourth indication information includes at least one of the following:

identifier information of the second terminal;

application layer configuration information of the second terminal;

access stratum configuration information of the second terminal; or indication information for instructing the first terminal to initiate the first network connection to the network device.

Optionally, the first network connection refers to that the first terminal or the second terminal is connected to or camps on or non-activated with a cellular network for the network device.

The second network connection is a non-cellular network connection between the first terminal and the second terminal.

It should be noted that this terminal embodiment is a terminal corresponding to the foregoing network switching method applied to the second terminal. All implementations of the foregoing embodiment are applicable to this terminal embodiment, and a same technical effect can also be achieved.

It should also be noted that some embodiments of the present disclosure also provide a terminal, the terminal is a second terminal, and the structure of the second terminal may be the same as the structure of the first terminal shown in FIG. 7.

Optionally, a processor of the second terminal is configured to: in a case that a first terminal establishes a network connection to the network device through a second terminal, release a second network connection to the first terminal;

where the second terminal is connected to the network device through the first network connection, and the second terminal is connected to the first terminal through the second network connection.

It should also be noted that the processor of the second terminal is further configured to implement other processes in the network switching method applied to the second terminal in the foregoing embodiment, and details are not described herein again.

Optionally, some embodiments of the present disclosure further provide a terminal. The terminal is a second terminal, including a processor, a memory, and a computer program stored in the memory and executable on the processor. When the computer program is executed by the processor, each process of the embodiment of the foregoing network switching method applied to the second terminal can be implemented, and a same technical effect can be achieved. To avoid repetition, details are not described herein.

Some embodiments of the present disclosure further provide a non-transitory computer-readable storage medium. The non-transitory computer-readable storage medium stores a computer program, and when a processor executes the computer program, the foregoing processes of the embodiment of the network switching method applied to the second terminal are implemented and a same technical effect can be achieved. To avoid repetition, details are not described herein again. The non-transitory computer-readable storage medium is, for example, a ROM, a RAM, a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In the absence of more limitations, an element defined by "including a . . . " does not preclude the existence of other identical elements in the process, method, article, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

It may be understood that the embodiments described in some embodiments of the present disclosure may be implemented by hardware, software, firmware, middleware, microcode, or a combination thereof. For implementation with hardware, a module, a unit, a submodule, a subunit, or the like can be implemented in one or more application specific integrated circuits (ASIC), a digital signal processor (DSP), a digital signal processing device (DSPD), a programmable logic device (PLD), a field-programmable gate array (PFGA), general processors, controllers, micro-controllers, microprocessors, and another electronic unit for implementing the functions of the present application, or their combinations.

For implementation with software, the technology described in some embodiments of the present disclosure may be implemented by executing functional modules (for example, a process and a function) described in some embodiments of the present disclosure. Software codes can be stored in the memory and executed by the processor. The memory may be implemented inside or outside the processor.

Therefore, the objectives of the present disclosure may also be achieved by running a program or a set of programs on any computing apparatus. The computing apparatus may be a well-known general-purpose apparatus. Therefore, the objective of the present disclosure may also be achieved only by providing a program product including program code for implementing the method or the apparatus. In other words, such a program product also constitutes the present disclosure, and a storage medium storing such a program product also constitutes the present disclosure. Obviously, the storage medium may be any well-known storage medium or any storage medium to be developed in the future. It should also be noted that in the apparatus and method of the present disclosure, apparently, the components or steps may be divided and/or recombined. These division and/or recombination should be considered as equivalent solutions of the present disclosure. Moreover, the steps for performing the foregoing series of processing may be performed naturally in a chronological order according to a described sequence, but do not necessarily need to be performed in the chronological order, and some steps may be performed in parallel or independently.

The foregoing descriptions are merely optional implementations of the present disclosure. It should be noted that a person of ordinary skill in the art may make several improvements and polishing without departing from the principle of the present disclosure and the improvements and polishing shall fall within the protection scope of the present disclosure.

What is claimed is:

1. A network switching method, applied to a network device and comprising:
in a case that a first terminal establishes a network connection to the network device through a second terminal, establishing a first network connection to the first terminal, and instructing the second terminal to release a second network connection to the first terminal; wherein before the establishing a first network connection to the first terminal, the method further comprises:
receiving a second network switching request sent by the second terminal; wherein
the second network switching request comprises:
auxiliary information sent by the first terminal to the second terminal, wherein the auxiliary information comprises configuration information or measurement information required for the first terminal to access a cellular network.

2. The network switching method according to claim 1, wherein before the establishing a first network connection to the first terminal, the method further comprises:
receiving a first network switching request sent by the first terminal.

3. The network switching method according to claim 2, wherein the first network switching request comprises at least one of:
a radio resource control (RRC) connection establishment request message;
identifier information of the first terminal;
a message indicating that the first terminal releases the second network connection;
a request message for network connection switching of the first terminal, wherein the network connection switching comprises: switching from the second network connection to the second terminal to the first network connection between the first terminal and the network device by the first terminal;
a request message for switching a preset service from the second terminal to the first terminal;
identifier information of the second terminal; or
auxiliary information sent by the second terminal to the first terminal; and/or
the second network switching request further comprises at least one of:
a RRC connection release request message;
identifier information of the second terminal;
identifier information of the first terminal;
a message indicating that the second terminal releases the second network connection; or
a request message for network connection switching of the first terminal, wherein the network connection switching comprises: switching from the second network connection to the second terminal to the first network connection between the first terminal and the network device by the first terminal.

4. The network switching method according to claim 2, wherein the establishing a first network connection to the first terminal comprises:
sending, to the first terminal, first response information that is fed back after the first network switching request of the first terminal is received; or
sending, to the first terminal, second response information that is fed back after the second network switching request of the second terminal is received.

5. The network switching method according to claim 4, wherein the first response information comprises at least one of:
an acknowledgment message;
identifier information of the second terminal;
application layer configuration information of the second terminal;

access stratum configuration information of the second terminal;
a paging message sent to the first terminal;
a request message for switching a preset service from the second terminal to the first terminal; or
indication information for instructing the second terminal to initiate RRC connection release to the network device through the first terminal; and/or
the second response information comprises at least one of:
an acknowledgment message;
identifier information of the second terminal;
application layer configuration information of the second terminal;
access stratum configuration information of the second terminal;
a paging message sent to the first terminal;
a request message for switching a preset service from the second terminal to the first terminal;
indication information for instructing the second terminal to initiate RRC connection release to the network device through the first terminal;
indication information for network connection switching of the first terminal, wherein the network connection switching comprises: switching from the second network connection to the second terminal to the first network connection between the first terminal and the network device by the first terminal;
indication information for instructing the first terminal to release the second network connection to the second terminal;
indication information for instructing the first terminal to initiate the first network connection to the network device; or
indication information for instructing the second terminal to release the first network connection to the network device.

6. The network switching method according to claim 1, wherein the instructing the second terminal to release a second network connection to the first terminal comprises:
sending first indication information to the second terminal.

7. The network switching method according to claim 6, wherein the first indication information comprises at least one of:
an acknowledgment message;
a radio resource control (RRC) connection release message;
identifier information of the first terminal;
indication information indicating that the first terminal establishes the first network connection to the network device;
indication information for network connection switching of the first terminal, wherein the network connection switching comprises: switching from the second network connection to the second terminal to the first network connection between the first terminal and the network device by the first terminal;
indication information indicating that the first terminal releases the second network connection to the second terminal;
indication information indicating that the first terminal initiates the first network connection to the network device through the second terminal; or
a request message for switching a preset service from the second terminal to the first terminal.

8. The network switching method according to claim 1, wherein the instructing the second terminal to release a second network connection to the first terminal comprises:
receiving second indicating information sent by the second terminal.

9. The network switching method according to claim 8, wherein the second indication information comprises at least one of:
an acknowledgment response message;
a radio resource control (RRC) connection release request message; or
identifier information of the first terminal.

10. The network switching method according to claim 1, wherein the establishing a first network connection to the first terminal comprises:
receiving radio resource control (RRC) connection establishment information sent by the first terminal.

11. The network switching method according to claim 10, wherein the RRC connection establishment information comprises at least one of which is sent by the first terminal to the network device:
identifier information of the second terminal;
application layer configuration information of the second terminal; or
access stratum configuration information of the second terminal.

12. The network switching method according to claim 1, wherein after the instructing the second terminal to release a second network connection to the first terminal, the method further comprises at least one of:
sending, to the second terminal, third indication information for instructing the second terminal to release the first network connection to the network device;
sending, to the second terminal, indication information indicating that the first terminal and the network device establish the first network connection; or
receiving radio resource control (RRC) connection release request information sent by the second terminal.

13. The network switching method according to claim 1, wherein the first network connection refers to that the first terminal or the second terminal is connected to or camps on a cellular network in radio resource control (RRC) Connected mode, RRC_Idle mode, or RRC_Inactive mode; and
the second network connection is a non-cellular network connection between the first terminal and the second terminal.

14. A network switching method, applied to a first terminal and comprising:
in a case that the first terminal establishes a network connection to a network device through a second terminal, establishing a first network connection to the network device, and releasing a second network connection to the second terminal; wherein
the second terminal is used to send a second network switching request, and the second network switch request comprises:
auxiliary information sent by the first terminal to the second terminal, wherein the auxiliary information comprises configuration information or measurement information required for the first terminal to access a cellular network.

15. The network switching method according to claim 14, wherein before the establishing a first network connection to a network device, the method further comprises:
sending a first network switching request to the network device.

16. The network switching method according to claim 15, wherein the establishing a first network connection to a network device comprises:
- receiving first response information that is fed back by the network device after the network device receives the first network switching request of the first terminal; or
- receiving second response information that is fed back by the network device after the network device receives the second network switching request of the second terminal.

17. The network switching method according to claim 14, wherein before the establishing a first network connection to a network device, the method further comprises:
- measuring a reference signal of a first network; or
- obtaining network measurement information of the second terminal related to the first network.

18. A network switching method, applied to a second terminal and comprising:
- in a case that a first terminal establishes a network connection to the network device through a second terminal, releasing a second network connection to the first terminal; wherein
- the second terminal is connected to the network device through the first network connection, and the second terminal is connected to the first terminal through the second network connection; wherein
- before the releasing a second network connection to the first terminal, the method further comprises:
- sending a second network switching request to the network device; wherein
- the second network switching request comprises:
- auxiliary information sent by the first terminal to the second terminal, wherein the auxiliary information comprises configuration information or measurement information required for the first terminal to access a cellular network.

19. The network switching method according to claim 18, wherein feeding back network measurement information of the second terminal related to the first terminal in a case that a second preset condition is met; wherein
the second preset condition comprises at least one of:
- releasing the second network connection by the second terminal and the first terminal;
- instructing the second terminal to trigger the first terminal to switch from the second network connection to the second terminal to the first network connection between the first terminal and the network device by a user operation or a higher layer;
- detecting that a signal of the second network connection to the first terminal is less than or equal to a preset signal value by the second terminal;
- detecting that a distance from the first terminal is greater than or equal to a preset distance by the second terminal; or
- detecting that a preset service with the first terminal is interrupted by the second terminal.

20. The network switching method according to claim 18, further comprising:
- receiving third indication information that is sent by the network device and that is for instructing the second terminal to release the first network connection to the network device;
- receiving indication information that is sent by the network device and that indicates that the first terminal and the network device establish the first network connection; or
- sending radio resource control (RRC) connection release request information to the network device.

* * * * *